Aug. 10, 1937.  E. S. SMITH, JR  2,089,441
TELEMETRIC RECEIVER
Filed July 5, 1934  2 Sheets-Sheet 1

INVENTOR
Ed S. Smith, Jr
BY Maxwell Barus
ATTORNEY

Aug. 10, 1937.  E. S. SMITH, JR  2,089,441
TELEMETRIC RECEIVER
Filed July 5, 1934   2 Sheets-Sheet 2

INVENTOR
*Ed S. Smith, Jr.*
BY
*Maxwell Barus*
ATTORNEY

Patented Aug. 10, 1937

2,089,441

UNITED STATES PATENT OFFICE 2,089,441

TELEMETRIC RECEIVER

Ed S. Smith, Jr., Providence, R. I., assignor to Builders Iron Foundry, Providence, R. I., a corporation of Rhode Island Application July 5, 1934, Serial No. 733,802

10 Claims. (Cl. 177—351)

My invention relates to improvements in telemetric receivers where a quantity is cyclically telemetered by signals that vary as a function of time. One object of my invention is to provide means for signalling a quantity by means of impulses spaced by a time duration corresponding with the quantity. Another object of my invention is to provide a simple receiver for such spaced signals adapted to record the value of the quantity corresponding therewith.

A specific object of my invention is to provide means for mechanically maintaining the receiver actuating parts in operative relation for the duration between the spaced signals corresponding to the quantity. A further specific object of my invention is to provide, in the above described combination, means for making apparent any interruption in the proper operation of the line connecting the receiver and transmitter by use of polarized, or different character, signalling impulses for the beginning and end of the signal duration corresponding with the quantity. Another specific object of my invention is to provide, in such a receiver, scale means for recording the normal transmitting range and having auxiliary indices for the receiver's recording pen's limits.

The production of a simple and reliable recording receiver for a telemetric system making use of the time duration between spaced signals is an object long sought. I have for the first time attained such an object, by the means hereinafter described, since I have provided a simple, reliable mechanical holding device for actuating the recording means by the spaced signals. I have provided means for telemetering by means of the time duration using two dot-impulses in such a way that false recordings are not given by the receiver in case of faulty line conditions; instead it indicates immediately that there is trouble on the line.

These, and such other features of my invention as may hereinafter appear, will be best understood from a description of the embodiments thereof illustrated in the accompanying drawings.

Figure 1:
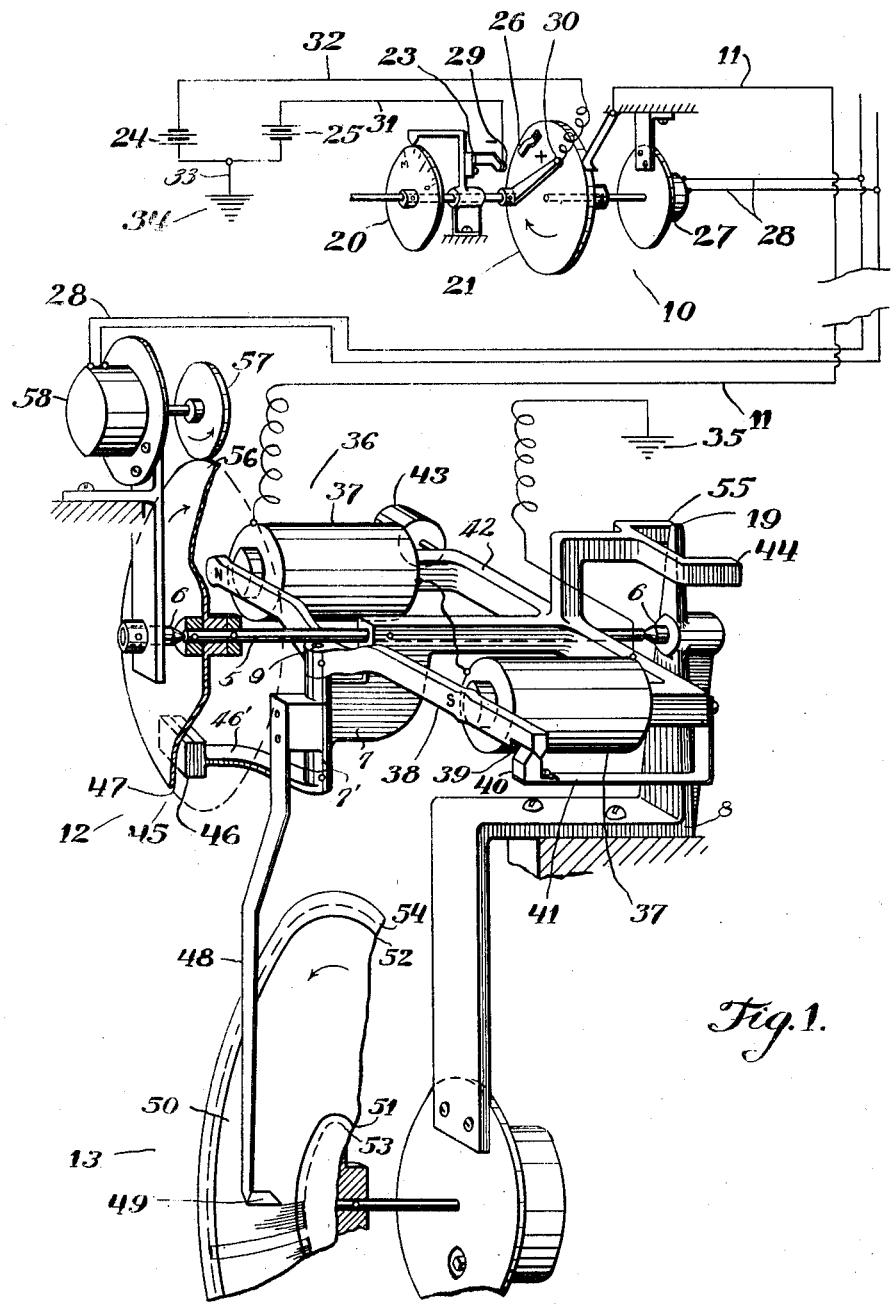
Figure 3:
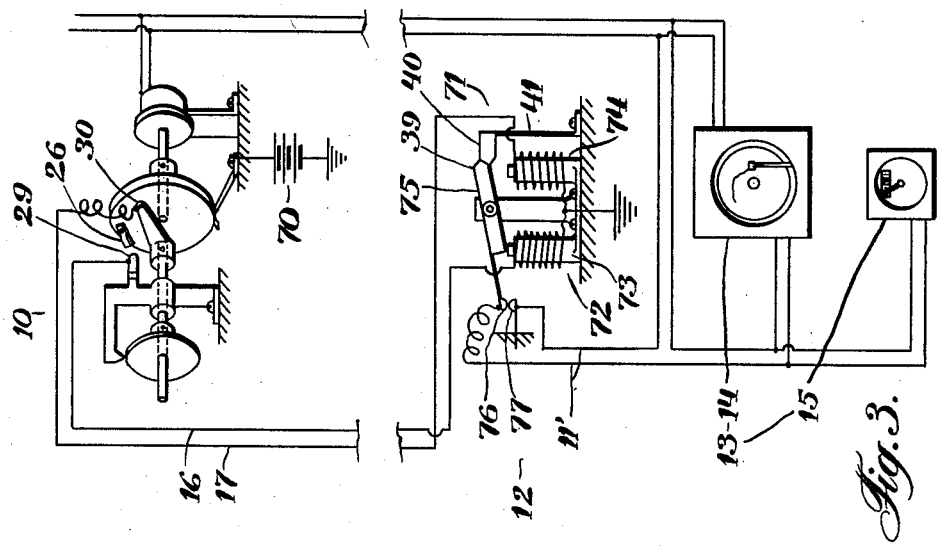
Figure 2:
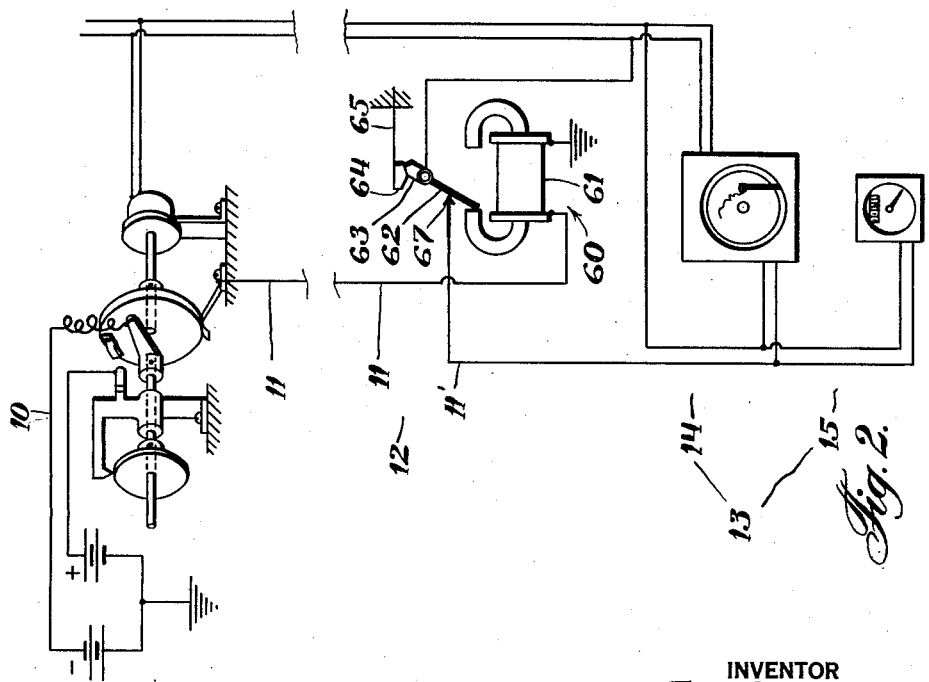

In the drawings, Fig. 1 is a diagrammatic view, partially shown in perspective, of the complete system I preferably use for telemetering two signals of a different character in a circuit for operating a receiver by a mechanical holding means for the duration of the signal. Fig. 2 is a diagrammatic view, generally similar to Fig. 1, in which a telemetric transmitter creates two dot-impulses spaced corresponding with the quantity telemetered and a mechanical holding relay creates off-on and on-off telemetric signals having durations corresponding with the spacing of the dot-impulses. These uninterrupted signals operate a receiver, of a well known type, diagrammatically shown. Fig. 3 is a similar view of another modification of my invention in which a plurality of lines are required instead of a single line as in Figs. 1 and 2.

In the drawings wherein like characters of reference indicate like parts throughout, I provide a telemetric transmitter 10 for creating dot-impulses in a circuit 11 and mechanical means 12 for actuating a receiver means 13 for the duration of the spaced signals.

In Fig. 1, I have provided a quantity responsive means 20 and means 21 continuously actuated for causing contact means 26 to coact with one limit 23 of the range of the transmitter 10 and to coact with the quantity responsive member 20 at its position corresponding with the quantity to be transmitted. I have provided current supply means 24 and 25 respectively for creating different character dot-signals in the circuit 11 connected to the contact means 26. These diagrammatic drawings show disk 21 and contact 26 rotated continuously by small, substantially synchronous motor 27 attached to A. C. supply line 28. In the path of the rotating contact 26 are contacts 29 and 30 respectively for one limit 23 of the transmitter range, and for quantity responsive means 20. These contacts 29 and 30 are supplied with current of a different character by supply means 24 and 25 respectively, through the respective supply lines 31 and 32. The contact means are also connected by a line 33 with a ground 34 that, with ground 35 at the receiver, forms part of circuit 11. At the receiver 13, I have provided polarized magnet 36 connected to circuit 11 consisting of electro-magnets 37 for operating permanent magnet lever 38 having a detent member 39 coacting with its companion detent member 40 held against detent member 39 by spring 41. This relay is mounted in a frame 42 of a recording apparatus, which frame is pivotally supported through rod 5 on horizontal bearings 6, 6. Said frame has an intermediate depending arm 7 from which extends downwardly an arm 48 carrying a pen 49. A counter-weight 43 on the frame 42 normally maintains the latter in a tilted position with its stop arm 44 in engagement with stop 19 of the stationary frame 8. The permanent magnet armature 38 is pinned to a vertical shaft 9 journaled in a vertical bearing portion 7' of said depending arm 7 of the frame 42. For rocking the frame 42 away from the position to which it is biased by the counter-weight 43, there is provided friction clutch means 45 comprising a spot clutch 46 carried by arm 46' pinned to the lower end of the aforesaid shaft 9. Said spot clutch 46 is adapted to engage disk clutch face 47 when armature 38 is swung into the position shown in Fig. 1, in which position said armature is held in clutch engaging position by the detent members 39 and 40. The pen 49 works over the surface of chart 50 having a transmitting range from 51 to 52 for the lower and higher limits respectively. Similarly, dotted lines 53 and 54 respectively are provided for the pen positions at the limits set by stops 44, 55 and 19. Stop 55 is provided to keep chart pen 49 within the limits of the chart 50. Clutch disc 47 is provided with peripheral spur gear teeth 56 and pinion gear 57 for driving it. Pinion gear 57 is rotated continuously by substantially synchronous motor 58 preferably connected to A. C. supply line 22.

The operation of the preferred embodiment shown in Fig. 1 is as follows:

At the transmitter 10, the synchronous motor 27 continuously rotates, at a substantially constant speed, causing contact 26 to first coact with contact 29 for the beginning of the telemetrically significant duration and then with contact 30 on quantity responsive member 20 after a period corresponding with the value of the quantity as indicated by the position of the quantity responsive member 20. These contacts 29 and 30 create signals of different character from separate supply lines 31 and 32 respectively. Thus the rotating contact 26 alternately sets up in circuit 11, connected thereto, dot-impulse signals of different character so that the receiver means 13 will infallibly distinguish therebetween. At the receiver, the counterweight 43 brings stop 44 of the recording means 42 against its limit stop 19 when the clutch means 45 is in inoperative position. The pen 49 remains on the dotted line 53 in this case until the rotating contact 26 makes contact with the first fixed contact 29. Then the clutch means 45 becomes engaged to move the recording means 42 from its initial position on the dotted line 53. The signalling impulses of contact 29 are negative while those for 30 are positive so that the polarized relay 36 operates to disengage the clutch means 45 on a positive impulse. Detent members 39 and 40 are held together by a spring 41 so that the spot clutch 40 consequently will be held against the disc clutch face 47 for the significant duration of the signals, i. e. between negative and positive impulses.

Fig. 2 shows a modification of my invention in which the transmitter 10 is as before. The receiver 13, however, is of the well known type operable in response to uninterrupted signalling impulses of time durations corresponding to the then values of the quantity being transmitted. Receiver means 13 may be a re-recorder 14 and an integrator 15. Interposed in telemetric circuit 11 is polarized relay switch 60 in which an electro-magnet 61 operates a permanent magnet bar 62 having detent member 63 attached thereto to coact with its companion detent member 64 mounted on spring 65. The permanent magnet bar 62 is adapted to alternately coact with fixed contact 67 to produce uninterrupted current signals in circuit 11' corresponding in duration with the significant interval between the successive dot impulses..

In Fig. 2 the operation is as follows:

As before, the transmitter operates to cyclically and alternately produce dot signals of different characters in circuit 11. These actuate the polarized relay switch 60 in a manner obvious from the foregoing description of operation of the embodiment shown in Fig. 1. Instead, however, of making a corresponding clutch engage directly, armature 62 and contact 67 coact to produce uninterrupted signalling currents that cause an electro-magnetically operated clutch to be cyclically actuated in a receiver for corresponding intervals. It is thus apparent that I have provided means for operating receiver means: a recorder and/or an integrator, which may be, for example, of the type shown in the patent to Welch 1,338,715, granted May 4, 1920 or the Reissue 19,039 to Wilde, or in the copending application of George T. Huxford, for Method of and apparatus for telemetric receiver indicating, Serial Number 621,211, filed July 7, 1932, and also assigned to the assignee of the present application.

Fig. 3 shows another embodiment of my invention in which I provide a transmitter 10 substantially as before. However, I use two separate lines 16 and 17 respectively for the signals from contacts 29 and 30 respectively instead of making them of different characters and I use unitary current supply means 70 instead of different supply means 24 and 25 as before. As before I provide mechanical detent means 71 for a relay 72 having two electro-magnets 73 and 74 respectively connected to contacts 29 and 30. This relay is equipped with a bar lever 75 adapted to be selectively operated by electro-magnets 73 and 74. At one end of the bar is detent member 39 cooperating with its companion detent member 40 mounted on spring 41. At the other end of the bar lever 75 is the contact 76 adapted to coact with fixed contact 77 to cyclically produce uninterrupted signalling impulses in circuit 11' attached thereto and connected to receiver means 13: recorder 14 and integrator 15, having the same method of operation as those shown in Fig. 2.

The operation then of the device in Fig. 3 is as follows:

As before, transmitter 10 has a contactor 26 continuously rotated to alternately contact fixed contact 29 and contact 30 positioned corresponding to the quantity to be telemetered. Electro-magnets 73 and 74 are connected thereto by means of lines 16 and 17. Upon contacts 26 and 29 making contact, electro-magnet 73 acts to pull its end of the bar lever 75 toward itself so that the detent 39 is moved past detent 40 and then held in its new position by detent 40 and spring 41. In this position the detent means holds contact 76 against contact 77 to create uninterrupted signalling impulses in circuit 11' corresponding in duration to the significant interval between contacts made with 29 and 30 respectively by continuously-rotating contact 26. Receivers 14 and 15 are operated by the uninterrupted signalling impulses as before described for Fig. 2. Obviously the signalling current in circuit 11' is interrupted when magnet 74 is energized by the coaction contacts 26 and 30, since bar lever 75 is then tilted to break contacts 76 and 77.

Broadly considered then, I have provided a telemeter, having a transmitter adapted to create two dot-impulses for controlling the actuation of a telemetric receiving member movable through an extent and for a time duration corresponding with the significant interval between said impulses. I have generally shown a mechanical holding means for a member selectively actuated by alternate impulses.

Although, in my preferred embodiment, I have somewhat diagrammatically shown different polarities to give the dot-signals different characters, I am not to be limited to this useful method: instead e. g. I can distinguish the sequence of signals by the use of different frequencies.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a system for telemetering a quantity, the combination of circuit means and transmitter and receiver means operatively connected thereby; said transmitter comprising means adapted to alternately produce in said circuit signalling impulses of different character spaced by durations corresponding with said quantity, and said receiver comprising operating means responsive to said signalling impulses, operated means actuated by said operating means in one direction by said signalling impulses of one character and in the opposite direction by said signalling impulses of a different character, and holding means for retaining said operated means in its last set position during said intervals between said spaced impulses.

2. In a system for telemetering a quantity, the combination of circuit means and transmitter and receiver means operatively connected thereby; said transmitter comprising means adapted to alternately produce signalling impulses of different character spaced by significant durations corresponding with said quantity; and said receiver means having a movable member, and means for actuating said member, and mechanically held means for controlling the actuating means to move said member through an extent corresponding with the duration of the intervals between said signalling impulses.

3. In a system for telemetering a quantity, the combination of circuit means and transmitter and receiver means operatively connected thereby; said transmitter comprising means adapted to cyclically produce signalling impulses spaced by an interval corresponding with said quantity and said receiver comprising indicating means, driving means continuously operable at substantially constant speed, operating means responsive to said spaced impulses, operated means actuated by said operating means, mechanical holding means for said operated means, and clutch means controlled by said mechanically held operated means adapted to cooperate with said driving means to move said indicating means through an extent proportional to said significant interval between said spaced impulses.

4. In a telemetric system as set forth in claim 3 said telemetering range lying between limits less than the movement of the indicating means.

5. In a system as in claim 3 said transmitting means having a fixed contact and another contact movable through a range corresponding with said quantity, said fixed contact being located to lie outside said quantity range, and said receiver being provided with stops for said indicating means and located to permit said indicating means to move over an extent greater than said quantity range, whereby excessive spacing of signals causes said indicating means to pass beyond the quantity range to thus indicate erroneous telemetering.

6. In a telemetric receiver for alternate impulses of opposite polarity spaced by intervals corresponding with a quantity, electro-magnetic means comprising operating means responsive to said signalling impulses, polarized means actuated by said operating means, and holding means for said polarized means, indicating means for said quantity, driving means operable at substantially constant speed and clutch means operatively connected and mechanically held to said polarized signal responsive means and adapted to coact with said driving means and said indicating means to move said indicating means an extent corresponding with said significant interval between said spaced impulses and hence to said telemetered quantity.

7. In a system for telemetering a quantity, the combination of circuit means and transmitter and receiver means operatively connected thereby; said transmitter comprising means adapted to cyclically produce in said circuit impulses spaced in duration corresponding with said quantity, said circuit comprising a telemetering circuit connected to said transmitter, relay means comprising operating means responsive to said spaced signals, operated means actuated by said operating means and mechanical holding means for said operated means, and circuit means connecting said receiver means with said telemetric signal responsive relay means, said relay means being adapted to produce continuous signals in said receiver circuit corresponding in duration with said significant space duration of said spaced signals.

8. In a system for telemetering a quantity, the combination of circuit means and transmitter and receiver means operatively connected thereby; said transmitter comprising means adapted to cyclically produce in said circuit impulses spaced in duration corresponding with said quantity, said circuit comprising a telemetering circuit connected to said transmitter, relay means comprising operating means responsive to said spaced signals, operated means actuated by said operating means and mechanical holding means for said operated means, and circuit means connecting said receiver means with said telemetric signal responsive relay means, said relay means being adapted to produce signals in said receiver circuit corresponding in duration with said significant space duration of said spaced signals.

9. In a system for telemetering a quantity, the combination of circuit means and transmitter and receiver means operatively connected thereby, said transmitter comprising means adapted to cyclically alternately produce in said circuit impulses of opposite polarity spaced in duration corresponding with said quantity, said circuit comprising a telemetering circuit connected to said transmitter, spaced signal responsive polarized relay means connected to said telemetering circuit and having mechanical holding means for said polarized relay, and circuit means connecting said receiver means with said telemetric signal responsive polarized relay means, said polarized relay means being adapted to produce signals in said receiving circuit corresponding in duration with said significant space duration of said spaced signals.

10. In a system for telemetering a quantity, the combination of circuit means and transmitter and receiver means operatively connected thereby; said transmitter comprising fixed contact means, contact means positionable through an extent corresponding with the quantity and means cyclically movable at substantially constant speed and adapted to coact with said contact means to produce signalling impulses in said circuit means spaced by an interval corresponding with said quantity, selective relay means having two sides and a movable portion mechanically held in its then position between impulses connected to said circuit and selectively responsive to said signalling impulses, said circuit means comprising one circuit connecting one side of said relay means with said fixed contact means and another circuit connecting said positionable contact means with the other side of said relay means, said relay means having switch means coacting with said movable portion and adapted to set up signalling impulses corresponding to said significant interval between successive signalling impulses, and circuit means connecting said relay switch means with said receiver means.

ED S. SMITH, Jr.